US011962963B2

(12) United States Patent
Matsumura

(10) Patent No.: US 11,962,963 B2
(45) Date of Patent: Apr. 16, 2024

(54) EARBUD

(71) Applicant: Panasonic Intellectual Property Corporation of America, Torrance, CA (US)

(72) Inventor: Toshiyuki Matsumura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 293 days.

(21) Appl. No.: 17/399,392

(22) Filed: Aug. 11, 2021

(65) Prior Publication Data

US 2021/0377644 A1 Dec. 2, 2021

Related U.S. Application Data

(63) Continuation of application No. PCT/JP2020/010150, filed on Mar. 10, 2020.

(30) Foreign Application Priority Data

Mar. 25, 2019 (JP) ................................ 2019-056633

(51) Int. Cl.
*H04R 1/10* (2006.01)

(52) U.S. Cl.
CPC ......... *H04R 1/1016* (2013.01); *H04R 1/1041* (2013.01); *H04R 2460/11* (2013.01); *H04R 2460/15* (2013.01)

(58) Field of Classification Search
CPC H04R 1/1016; H04R 1/1041; H04R 2460/11; H04R 2460/15
See application file for complete search history.

(56) References Cited

U.S. PATENT DOCUMENTS 8,379,895 B2 2/2013 Gebert et al.
2001/0043708 A1* 11/2001 Brimhall ............. H04R 25/656 381/328
2008/0095390 A1 4/2008 Gebert et al.
(Continued)

FOREIGN PATENT DOCUMENTS

DE 202018107570 U1 1/2019
EP 2747455 A2 6/2014
(Continued)

OTHER PUBLICATIONS

International Search Report issued in International Bureau of WIPO Patent Application No. PCT/JP2020/010150, dated Jun. 2, 2020, along with an English translation thereof.
(Continued)

*Primary Examiner* — Sunita Joshi
(74) *Attorney, Agent, or Firm* — Greenblum & Bernstein, P.L.C.

(57) ABSTRACT

An earbud includes: a speaker unit which generates a sound wave; a first housing which houses the speaker unit, and has a first opening which faces a sound wave generation surface of the speaker unit; a sound conduit having one end connected to the first opening; an ear plug which is attached to the other end of the sound conduit, the ear plug being inserted into the ear canal; and an air conduit which is disposed so as to penetrate the ear plug and the first housing, the air conduit being disposed independently from the sound conduit.

7 Claims, 11 Drawing Sheets

(56) References Cited

U.S. PATENT DOCUMENTS

| | | | |
|---|---|---|---|
| 2013/0148830 | A1 | 6/2013 | Sakaguchi et al. |
| 2014/0169603 | A1 | 6/2014 | Sacha et al. |
| 2019/0208301 | A1 | 7/2019 | Monti et al. |

FOREIGN PATENT DOCUMENTS

| | | | | |
|---|---|---|---|---|
| JP | 5914887 | B2 | | 5/2016 |
| JP | 2018-121285 | A | | 8/2018 |
| JP | 2018121285 | A | * | 8/2018 |
| WO | WO 00/42817 | A1 | | 7/2000 |

OTHER PUBLICATIONS

Extended European Search Report issued in European Patent Office (EPO) Patent Application No. 20779563.4, dated Apr. 21, 2022.

* cited by examiner

EARBUD

CROSS-REFERENCE TO RELATED APPLICATIONS

This application is a Bypass Continuation of International Application No. PCT/JP2020/010150 filed Mar. 10, 2020, which is based upon and claims the benefit of foreign priority to Japanese Patent Application No. 2019-056633 filed on Mar. 25, 2019. The content of each application is herein incorporated by reference in its entirety.

TECHNICAL FIELD

The present disclosure relates to an earbud used by inserting an ear plug into an ear canal.

BACKGROUND ART

Conventionally, there has been known an earbud used by inserting an ear plug into an ear canal. However, with such an earbud, a space in the ear canal is brought into a sealed state where the earbud gives a discomfort to a user due to a moistened state. With such a configuration, for example, Patent Literature 1 proposes an earbud where an ear plug is attached to a sound conduit which emits a sound wave generated by a speaker unit into an ear canal, an air vent hole is disposed in the sound conduit, and an opening area of the air vent hole is controlled so as to adjust a sealed state of a space in the ear canal.

However, in the earbud described in Patent Literature 1, since the air vent hole is disposed in the sound conduit, a length of the air vent hole is limited to a length of the sound conduit. With such a configuration, the air resistance in the air vent hole is limited to a small amount. Accordingly, a sound wave in a low frequency range in the ear canal easily leaks to the outside through the air vent hole. As a result, there exists a problem that sound quality in a low frequency range deteriorates in the ear canal.

CITATION LIST

Patent Literature

Patent Literature 1: JP 5914887 B2

SUMMARY OF INVENTION

The present disclosure has been made in view of the above-mentioned problems, and an object of the present invention is to provide an earbud capable of suppressing both discomfort due to a moistened state in an ear canal and deterioration of sound quality of a reproduced sound in a low frequency range.

An earbud of the present disclosure includes: a speaker unit which generates a sound wave; a first housing which houses the speaker unit, and has a first opening which faces a sound wave generation surface of the speaker unit; a sound conduit having one end connected to the first opening; an ear plug which is attached to the other end of the sound conduit, the ear plug being inserted into an ear canal; and an air conduit which is disposed so as to penetrate the ear plug and the first housing, the air conduit being disposed independently from the sound conduit.

DESCRIPTION OF EMBODIMENTS (Background of Present Disclosure)

Figure 7:
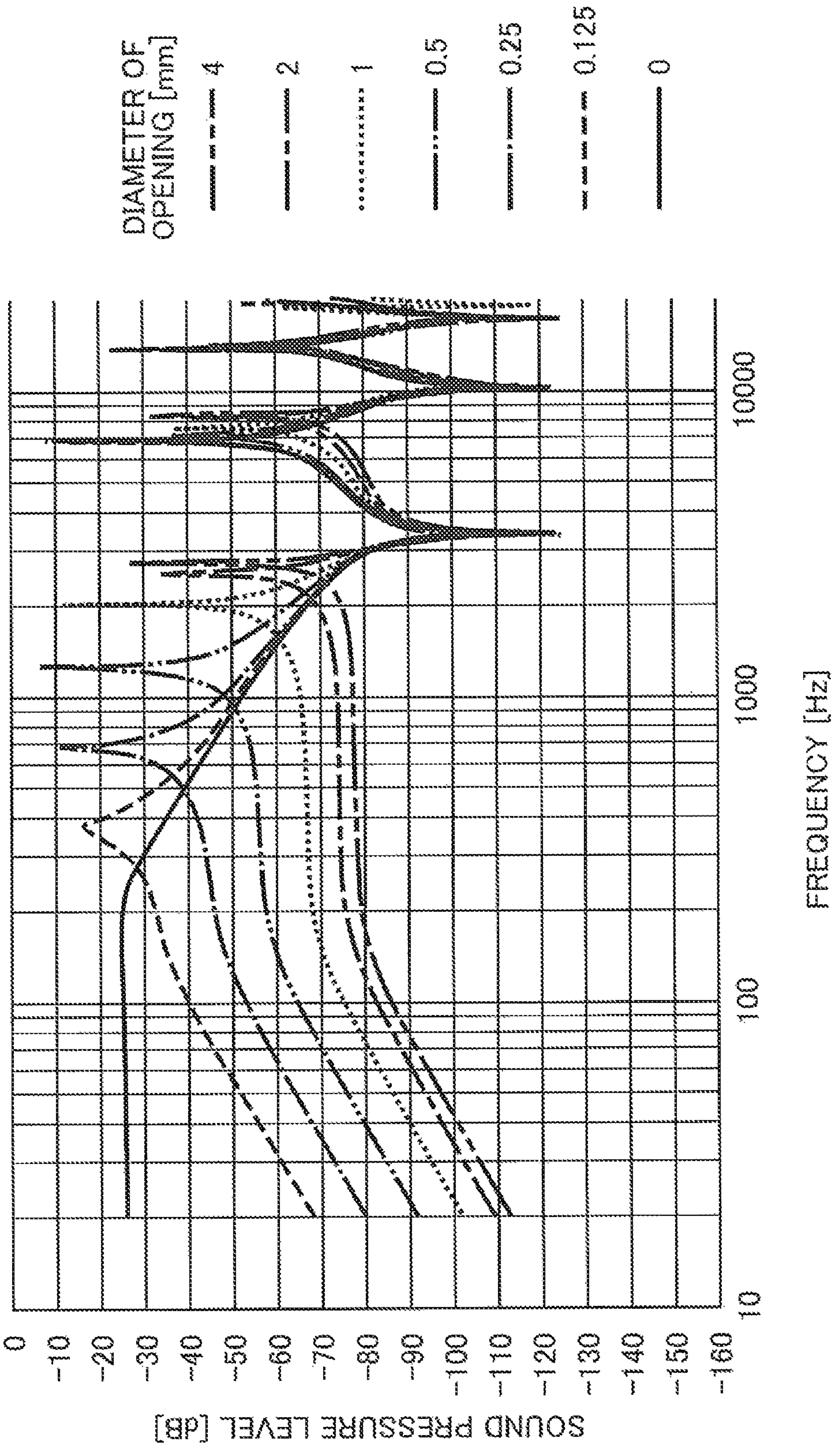
FIG. 7 is a view showing sound pressure frequency characteristics of sound waves generated by a speaker unit obtained from a result of measurement of the sound waves performed in a state where a conventional earbud is attached to a model of an ear, the sound waves being measured at a position of an eardrum of the model of the ear.

The earbud described in Patent Literature 1 was attached to a model of an ear, and sound waves generated by a speaker unit was measured at a position of an eardrum of the model. As a result of the measurement, sound pressure frequency characteristics shown in FIG. 7 were obtained. In FIG. 7, the horizontal axis indicates frequency, and the vertical axis indicates a sound pressure level. FIG. 7 shows the sound pressure frequency characteristics when a radius of an opening of an air vent hole disposed in a sound conduit is set to 4 mm, 2 mm, 1 mm, 0.5 mm, 0.25 mm and 0.125 mm. FIG. 7 also shows the sound pressure frequency characteristic when the radius of the opening of the air vent hole is set to 0 mm, that is, when the air vent hole is not disposed in the sound conduit.

As shown in FIG. 7, according to the earbud described in Patent Literature 1, the sound pressure levels of the sound waves in a high frequency range of 1200 Hz or higher are maintained at almost the same level as the case where an air vent hole is not disposed in a sound conduit regardless of a radius of an opening. However, the sound pressure levels of sound waves in a low frequency range of 300 Hz or less become such that the larger the radius of the opening, the larger the decrease of the sound pressure level becomes compared to the case where the air vent hole is not disposed in the sound conduit. As a result, the present inventors have found that the earbud described in Patent Literature 1 has a problem that sound quality in the low frequency range of 300 Hz or less deteriorates.

In view of the above, the present inventors have made extensive studies on the reason why sound quality in a low frequency range of 300 Hz or less deteriorates in the earbud described in Patent Literature 1, and have made the following finding. In the earbud described in Patent Literature 1, the air vent hole is disposed in the sound conduit and hence, the length of the air vent hole is limited to the length of the sound conduit. As a result, the air resistance in the air vent hole is limited to a small amount and hence, sound waves in a low frequency range in the ear canal easily leak to the outside through the air vent hole. The present inventors have found that a problem occurs in which sound quality in a low frequency range deteriorates in the ear canal due to the above-mentioned phenomenon.

The present disclosure has been made to solve the above-mentioned problem, and an object of the present disclosure is to provide an earbud capable of suppressing both discomfort due to a moistened state in an ear canal and deterioration of sound quality in a low frequency range in an ear canal.

An earbud according to an aspect of the present disclosure includes: a speaker unit which generates a sound wave; a first housing which houses the speaker unit, and has a first opening which faces a sound wave generation surface of the speaker unit; a sound conduit having one end connected to the first opening; an ear plug which is attached to the other end of the sound conduit, the ear plug being inserted into the ear canal; and an air conduit which is disposed so as to penetrate the ear plug and the first housing, the air conduit being disposed independently from the sound conduit.

According to this aspect, the air conduit is disposed so as to penetrate the ear plug and the first housing. With such a configuration, when the ear plug is inserted into the ear canal, the air conduit allows a space in the ear canal and a space outside the ear canal to communicate with each other. Accordingly, the air in the ear canal can be discharged to the space outside the ear canal. With such a configuration, a user can reduce discomfort caused by a moistened state in the ear canal.

Further, the air conduit is disposed independently from the sound conduit. Accordingly, the length of the air conduit can be increased regardless of the length of the sound conduit. As a result, the air resistance in the air conduit can be increased. Accordingly, it is possible to reduce an amount of sound waves in a low frequency range which is emitted into the ear canal through the sound conduit and leaks to the outside through the air conduit. As a result, deterioration of sound quality in a low frequency range in the ear canal can be suppressed.

In the above-mentioned aspect, the earbud may further include a second housing which houses a control circuit for controlling driving of the speaker unit, and a battery which supplies electric power for driving the speaker unit, wherein the air conduit may be disposed so as to penetrate the second housing.

According to this aspect, the air conduit is disposed so as to penetrate the ear plug, the first housing, and the second housing. With such a configuration, the air conduit can be made longer compared to the case where the air conduit is disposed so as to penetrate only the ear plug and the first housing. Accordingly, compared to the above-mentioned case, the air resistance in the air conduit can be further increased and hence, it is possible to further reduce an amount of sound waves in a low frequency range which is emitted into the ear canal through the sound conduit and leaks to the outside through the air conduit. As a result, it is possible to suppress the deterioration of sound quality in a low frequency range in the ear canal compared to the above-mentioned case.

Further, by supporting an intermediate portion of the air conduit between the first housing and the second housing by an upper part of a base of an ear, the earbud according to this aspect can be used as a so-called ear-hook type earbud equipped with the control circuit and the battery for driving the earbud.

In the above-mentioned aspect, the earbud may further include a second housing which has a second opening and a third opening, and houses a control circuit for controlling driving of the speaker unit and a battery which supplies electric power for driving the speaker unit, wherein one end of the air conduit on a first housing side may be connected to the second opening.

According to this aspect, the air conduit penetrates the ear plug and the first housing, and one end of the air conduit on the first housing side is connected to the second opening of the second housing. Further, the second housing has a third opening. With such a configuration, when the ear plug is inserted into the ear canal, air in the ear canal is made to pass through the ear plug and the first housing in the air conduit and, then, can be discharged into the second housing from the second opening, and can be discharged from the inside of the second housing to the outside through the third opening.

With such a configuration, air resistance which air in the ear canal receives before air is discharged to the outside can be increased compared to the case where the air conduit is disposed so as to penetrate only the ear plug and the first housing. Accordingly, it is possible to reduce an amount of sound waves in a low frequency range which is emitted into the ear canal through the sound conduit and leaks to the outside. As a result, it is possible to suppress the deterioration of sound quality in a low frequency range in the ear canal compared to the above-mentioned case.

Further, in the case where the earbud according to this aspect is used as a so-called ear-hook type earbud equipped with the control circuit and the battery for driving the earbud, the intermediate portion of the air conduit between the first housing and the second housing is supported by an upper part of the base of the ear. Accordingly, the length of the intermediate portion is limited. However, in this aspect, even if the length of the intermediate portion is limited as described above, by increasing a volume of the second housing, the air resistance, which air receives before the sound wave in the ear canal is emitted to the outside, can be increased. As a result, it is possible to suppress the deterioration of sound quality in a low frequency range in the ear canal caused by the leakage of a sound wave in a low frequency range in the ear canal to the outside.

In the above-mentioned aspect, the first housing may further house a control circuit for controlling the driving of the speaker unit and a battery for supplying electric power for driving the speaker unit.

According to this aspect, the control circuit and the battery are housed in the first housing. With such a configuration, a space required for using the earbud can be reduced compared to the case where the control circuit for controlling the driving of the speaker unit and the battery for supplying electric power for driving the speaker unit are housed in a housing outside the first housing, and the control circuit and the battery are connected with the speaker unit in the first housing by wire.

An earbud according to another aspect of the present disclosure may include: a speaker unit which generates a sound wave; a first housing which houses the speaker unit, and has a first opening which faces a sound wave generation surface of the speaker unit; a second housing which has a second opening and a third opening and houses a control circuit for controlling driving of the speaker unit and a battery for supplying electric power for driving the speaker unit; a sound conduit having one end connected to the first opening; an ear plug which is attached to the other end of the sound conduit, the ear plug being inserted into the ear canal; and an air conduit having one end disposed in a space between the sound wave generation surface and the first opening in the first housing and the other end of the air conduit is connected to the second opening, the air conduit being configured to penetrate the first housing.

According to this aspect, the air conduit is disposed so as to penetrate the first housing, one end of the air conduit is disposed in the space between the sound wave generation surface of the speaker unit and the first opening in the first housing, and the other end of the air conduit is connected to the second opening. With such a configuration, when the ear plug is inserted into the ear canal, air in the ear canal is made to pass through the sound conduit and, then, can be discharged into the space between the sound wave generation surface of the speaker unit and the first opening in the first housing and, then, is made to pass through the first housing in the air conduit and is discharged into the second housing, and can be discharged from the inside of the second housing to the outside through the third opening.

With such a configuration, air resistance which air in the ear canal receives before air is discharged to the outside can be increased compared to the conventional case where air in the ear canal is discharged to the outside through the air conduit disposed in the sound conduit. Accordingly, compared to the conventional case, it is possible to reduce an amount of sound waves in a low frequency range which is emitted into the ear canal through the sound conduit and leaks to the outside. As a result, compared to the conventional case, it is possible to suppress deterioration of sound quality in a low frequency range in the ear canal.

In the above-mentioned aspect, the earbud may further include: an adjustment mechanism which is configured to change an inner diameter of the air conduit; and a control unit which is configured to switch the air conduit between a closed state where the air conduit is closed and an open state where the air conduit is opened by controlling the adjustment mechanism.

According to this aspect, the control unit can, by controlling the adjustment mechanism, perform switching whether air in the ear canal should be discharged to the outside through the air conduit or not by switching the air conduit between an open state and a closed state. As a result, it is possible to perform switching whether priority should be assigned to elimination of discomfort caused by a moistened state in the ear canal or suppression of deterioration of sound quality of a reproduced sound in a low frequency range.

First Embodiment

Figure 1:
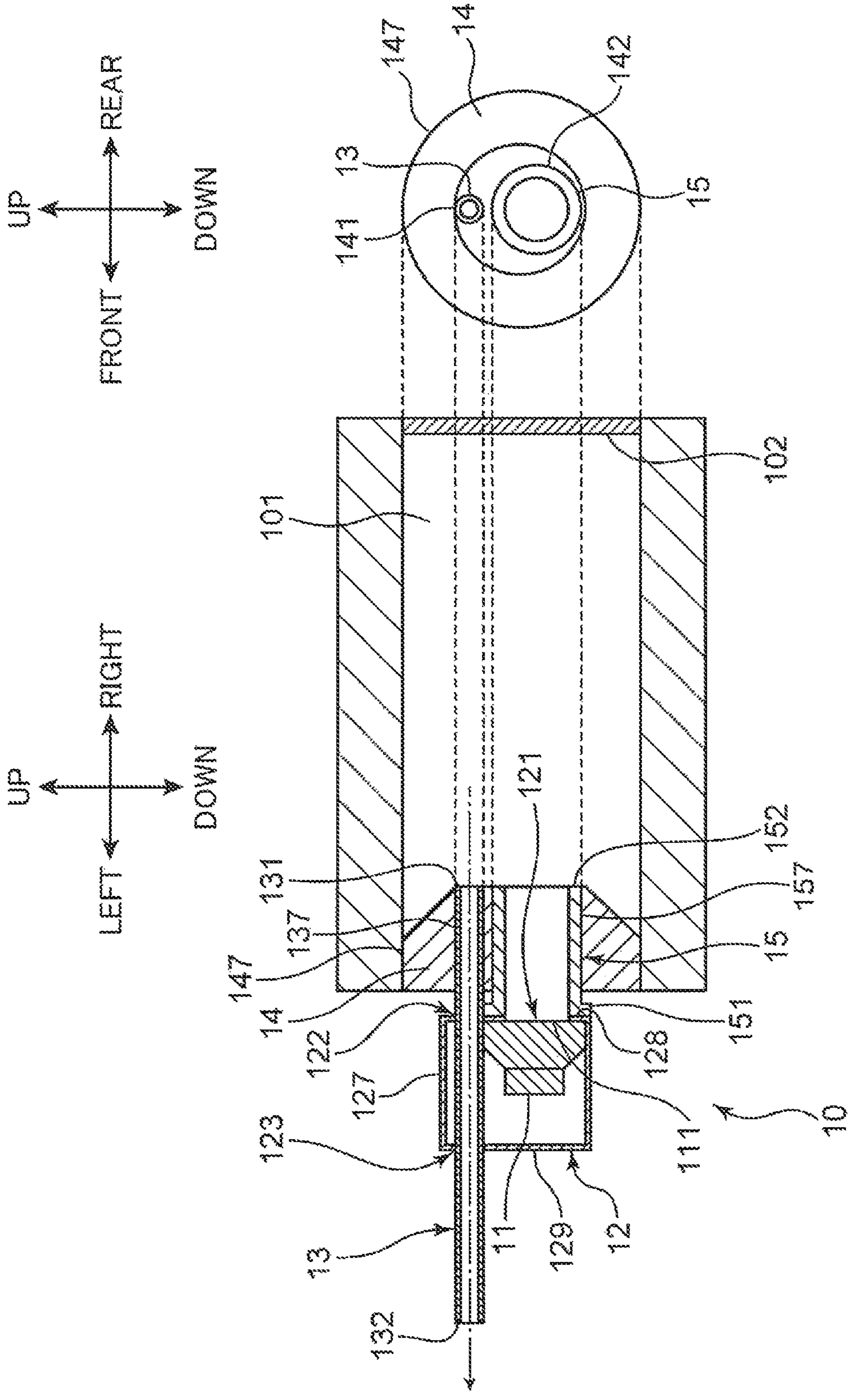
FIG. 1 is a view showing a structure of an earbud according to a first embodiment.

FIG. 1 is a structural view of an earbud 10 according to a first embodiment. A left view in FIG. 1 is a front sectional view of the earbud 10 attached to an ear, and a right view in FIG. 1 is a side view of the earbud 10 which the user attaches to his ear in a state where the earbud 10 is viewed in a direction from an eardrum 102 to the outside of an ear canal 101. As shown in the left view in FIG. 1, the earbud 10 includes a speaker unit 11, a first housing 12, a sound conduit 15, an ear plug 14, and an air conduit 13.

The speaker unit 11 generates sound waves based on an audio signal inputted from an external device (not shown) via a wire or wirelessly.

The first housing 12 is a part having substantially a tubular shape, and houses the speaker unit 11. A first opening 121 and a second opening 122 are formed in a right surface 128 of the first housing 12. A third opening 123 is formed in a left surface 129 of the first housing 12.

The first opening 121 has a circular shape and is disposed at a position where the first opening 121 faces a sound wave generation surface 111 of the speaker unit 11. The first opening 121 is provided for emitting a sound wave generated on the sound wave generation surface 111 of the speaker unit 11 to the outside of the first housing 12.

The second opening 122 is disposed above the first opening 121, and has a circular shape and a diameter smaller than a diameter of the first opening 121. The third opening 123 has the same shape as the second opening 122, and is disposed at the same position (height) as the second opening 122 in the vertical direction. The second opening 122 and the third opening 123 are formed as through holes through which the air conduit 13 having a cylindrical shape passes.

The sound conduit 15 is a part having substantially a tubular shape and has an opening at each of both ends. An inner diameter of the sound conduit 15 is substantially the same as the diameter of the first opening 121. A left opening end 151 (one end) of the sound conduit 15 is connected to a first opening 121 formed in a right surface 128 of the first housing 12. An ear plug 14 is attached to a peripheral surface 157 of a right opening end 152 (the other end) of the sound conduit 15.

The sound conduit 15 allows a sound wave which is generated on the sound wave generation surface 111 of the speaker unit 11 and is emitted from the first opening 121 to be inputted into the sound conduit 15 from the left opening end 151 and to be emitted from the right opening end 152. It is sufficient that the sound conduit 15 opens at both ends. A cross-sectional shape of the sound conduit 15 is not limited to a circular shape shown in the right view in FIG. 1, and may be a shape different from a circular shape.

The ear plug 14 is a part which has a substantially tubular shape and is inserted into the ear canal 101. The ear plug 14 is formed of an elastic member made of rubber or the like. The ear plug 14 has two through holes 141 and 142 extending in a left-right direction. The ear plug 14 allows a right opening end 131 of the air conduit 13 to pass through the through hole 141, and allows a right opening end 152 of the sound conduit 15 to pass through the through hole 142. The ear plug 14 is fixed to a peripheral surface 137 of the air conduit 13 at the right opening end 131 and the peripheral surface 157 of the sound conduit 15 at the right opening end 152. When the ear plug 14 is inserted into the ear canal 101, a peripheral surface 147 of the ear plug 14 expands in a vertical direction and in a front-rear direction, and the peripheral surface 147 is brought into contact with an inner wall of the ear canal 101. As a result, the earbud 10 is attached to the ear.

The air conduit 13 is a part which has a substantially tubular shape and has opening ends 131 and 132 at both ends. The air conduit 13 is disposed so as to pass through the through hole 141 formed in the ear plug 14, and to also pass through the second opening 122 formed in a right surface 128 of the first housing 12 and the third opening 123 formed in a left surface 129 of the first housing 12. That is, the air conduit 13 is disposed so as to penetrate the ear plug 14 and the first housing 12. As described above, the second opening 122 and the third opening 123 are disposed at the same position (height) as the second opening 122 in the vertical direction. With such a configuration, the air conduit 13 can be formed in a simple straight line shape.

The air conduit 13 is disposed so as to pass through the through hole 141, which is different from the through hole 142 for the sound conduit 15 formed in the ear plug 14 and, on the right surface 128 of the first housing 12, the air conduit 13 passes through the second opening 122, which is different from the first opening 121 to which the left opening end 151 of the sound conduit 15 is connected. In this manner, the air conduit 13 is disposed independently from the sound conduit 15 so that the space in the air conduit 13 and the space in the sound conduit 15 do not directly communicate with each other.

When the ear plug 14 is inserted into the ear canal 101 and the earbud 10 is attached to the ear, the air conduit 13 allows the space in the ear canal 101 and the space outside the ear canal 101 to communicate with each other, and allows air in the ear canal 101 to move from the right opening end 131 to the left opening end 132. The inner diameter of the air conduit 13 is set smaller than the inner diameter of the sound conduit 15. With such a configuration, it is possible to prevent a sound wave which is emitted from the sound wave generation surface 111 of the speaker unit 11, passes through the sound conduit 15 from the first opening 121, and is emitted into the ear canal 101 from excessively leaking to the outside through the air conduit 13.

It is sufficient that the air conduit 13 opens at both ends. A cross-sectional shape of the air conduit 13 is not limited to a circular shape shown in the right view in FIG. 1, and may be a shape different from a circular shape. In FIG. 1, the left opening end 132 of the air conduit 13 protrudes to the left with respect to the third opening 123. However, the left opening end 132 of the air conduit 13 is not limited to such a configuration, and the left opening end 132 of the air conduit 13 may be connected to the third opening 123.

In FIG. 1, the second opening 122 and the third opening 123 are disposed at the same position (height) in the vertical direction. However, the third opening 123 may be disposed below the second opening 122, or may be disposed on a peripheral surface 127 of the first housing 12. In conformity with such a configuration, the air conduit 13 may be formed in a bent shape or a curved shape in the first housing 12 such that the air conduit 13 passes through the second opening 122 and the third opening 123.

As described above, according to the aspect of the first embodiment, the air conduit 13 is disposed so as to penetrate the ear plug 14 and the first housing 12. With such a configuration, when the ear plug 14 is inserted into the ear canal 101, the air conduit 13 allows the space in the ear canal 101 and the space outside the ear canal 101 to communicate with each other. Accordingly, air in the ear canal 101 can be discharged to the space outside the ear canal 101. With such a configuration, a user can reduce discomfort caused by a moistened state in the ear canal 101.

The air conduit 13 is disposed independently from the sound conduit 15 so that a space in the air conduit 13 and the space in the sound conduit 15 do not directly communicate with each other. With such a configuration, the length of the air conduit 13 can be increased regardless of the length of the sound conduit 15. Accordingly, the air resistance in the air conduit 13 can be increased and hence, it is possible to reduce an amount of sound waves in a low frequency range which is emitted into the ear canal 101 through the sound conduit 15 and leaks to the outside through the air conduit 13. As a result, deterioration of sound quality in a low frequency range in the ear canal 101 can be suppressed.

Figure 2:
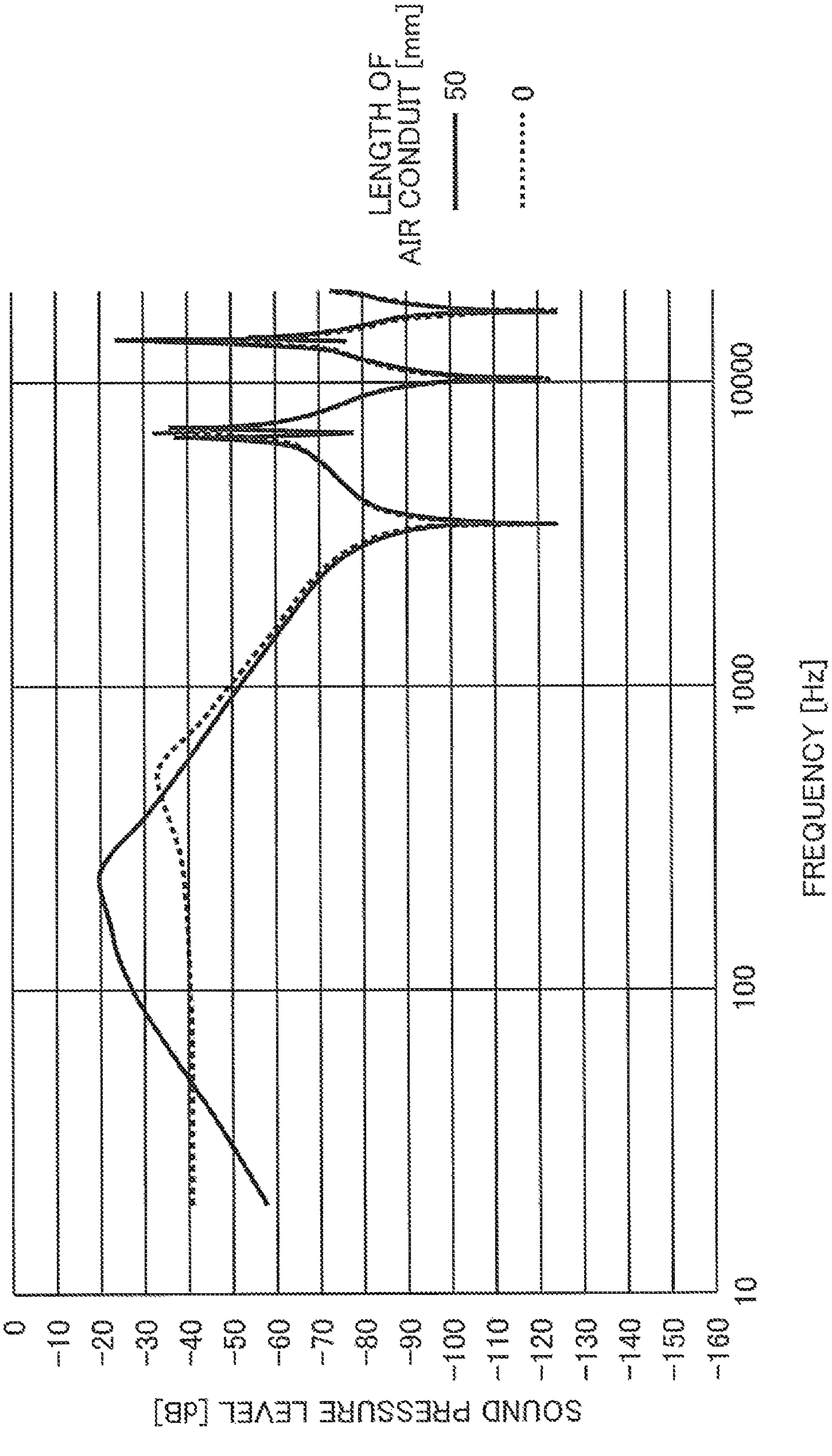
FIG. 2 is a view showing sound pressure frequency characteristics of sound waves generated by a speaker unit obtained from a result of measurement of the sound waves performed in a state where the earbud according to the first embodiment is attached to a model of an ear, the sound waves being measured at a position of an eardrum of the model of the ear.

FIG. 2 is a view showing a sound pressure frequency characteristic of a sound wave generated by the speaker unit 11 obtained from a result of measurement of the sound wave performed in a state where the earbud 10 according to the first embodiment is attached to a model of an ear, the sound wave being measured at a position of an eardrum of the model of the ear. In FIG. 2, the horizontal axis indicates frequency, and the vertical axis indicates a sound pressure level. FIG. 2 shows a sound pressure frequency characteristic in the case where the length of the air conduit 13 is set to 50 mm, and a sound pressure frequency characteristic in the case where the length of the air conduit 13 is set to 0 mm, that is, in the case where the air conduit 13 is not provided.

As shown in FIG. 2, according to the earbud 10 of the first embodiment, a sound pressure level in a high frequency range of 1000 Hz or higher can be set to substantially the same level as in the case where the air conduit 13 is not provided. Accordingly, the sound pressure level in the high frequency range can be ensured, and sound quality in the high frequency range can be set to substantially the same sound quality as in the case where the air conduit 13 is not provided. Further, in the case where the length of the air conduit 13 is set to 50 mm, the sound pressure level in the low frequency range from 100 Hz to about 400 Hz can be raised compared to the case where the air conduit 13 is not provided. Accordingly, the sound pressure level in the low frequency range can be ensured, and the deterioration of sound quality in the low frequency range can be suppressed.

Second Embodiment

Figure 3:
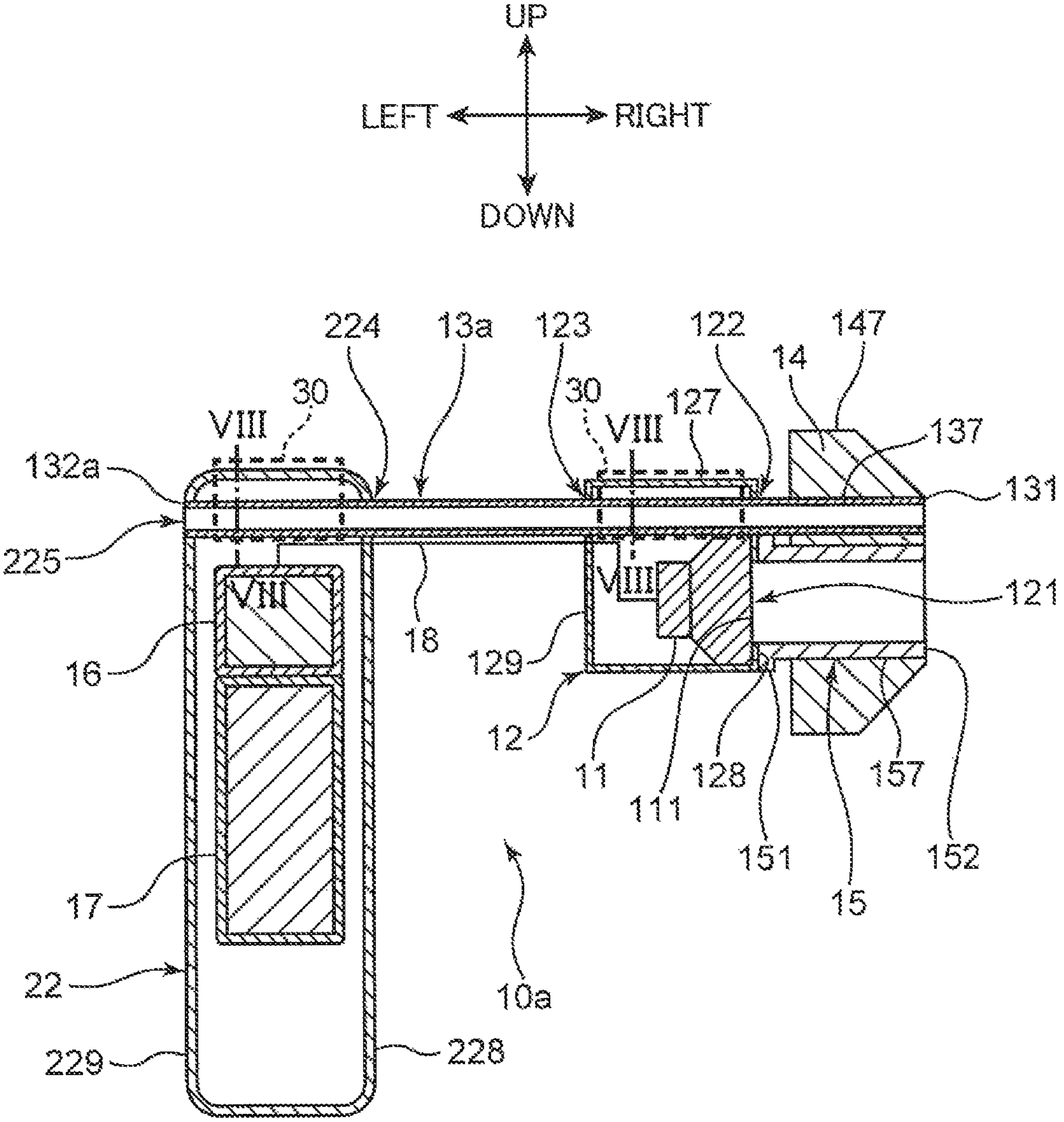
FIG. 3 is a view showing a structure of an earbud according to a second embodiment.

FIG. 3 is a view showing a structure of an earbud **10*a* according to a second embodiment. FIG. 3 is, similar to the left view in FIG. 1, a front sectional view of the earbud 10*a* in a state where the earbud 10 is attached to an ear. However, the inside of an ear canal 101** is not illustrated. In the description made hereinafter, constituent elements which are identical with the constituent elements described above are given the same reference numerals, and the description of the constituent elements is omitted.

As shown in FIG. 3, the earbud **10*a* according to the second embodiment includes a speaker unit 11, a first housing 12, a sound conduit 15, an ear plug 14, and an air conduit 13*a*. The earbud 10*a* further includes a second housing 22**.

The second housing 22 is a part elongated in a vertical direction and having a box shape. The second housing 22 houses a control circuit 16 for controlling driving of the speaker unit 11 and a battery 17 for supplying electric power for driving the speaker unit 11. The second housing 22 is disposed such that a right surface 228 of the second housing 22 faces a left surface 129 of the first housing 12. A fourth opening 224 is formed in the right surface 228 of the second housing 22. A fifth opening 225 is formed in a left surface 229 of the second housing 22.

The fourth opening 224 is disposed at the same position (height) as the third opening 123 of the first housing 12 in the vertical direction. With such a configuration, the fourth opening 224 is formed such that the fourth opening 224 faces the third opening 123. The fourth opening 224 has the same shape as the third opening 123. The fifth opening 225 has the same shape as the fourth opening 224, and is disposed at the same position (height) as the fourth opening 224 in the vertical direction. The fourth opening 224 and the fifth opening 225 are formed as through holes through which the air conduit **13*a*** passes.

The control circuit 16, the battery 17, and the speaker unit 11 are connected with each other by a wiring 18 attached to an outer peripheral portion of the air conduit **13*a* which passes through the fourth opening 224 and the third opening 123. In FIG. 3, for the sake of clarity, the wiring 18 is shown at a position away from the outer peripheral portion of the air conduit 13*a***.

The air conduit 13*a* is disposed so as to pass through not only a through hole 141 formed in the ear plug 14 (the right view in FIG. 1) and a second opening 122 and the third opening 123 of the first housing 12, but also the fourth opening 224 and the fifth opening 225. With such a configuration, the air conduit 13*a* is disposed so as to penetrate the ear plug 14, the first housing 12, and the second housing 22. A left opening end 132*a* of the air conduit 13*a* is connected to the fifth opening 225. However, the left opening end 132*a* of the air conduit 13*a* is not limited to such a configuration, and may protrude to a left side with respect to the fifth opening 225.

As described above, the second opening 122, the third opening 123, the fourth opening 224, and the fifth opening 225 are disposed at the same position (height) in the vertical direction. With such a configuration, the air conduit 13*a* can be formed in a simple straight line shape.

According to the aspect of the second embodiment, the air conduit 13*a* is disposed so as to penetrate the ear plug 14, the first housing 12, and the second housing 22. With such a configuration, the air conduit 13*a* can be made longer compared to the case where the air conduit 13*a* is disposed so as to penetrate only the ear plug 14 and the first housing 12. Accordingly, compared to the above-mentioned case, the air resistance in the air conduit 13*a* can be further increased and hence, it is possible to further reduce an amount of sound waves in a low frequency range which is emitted into the ear canal 101 through the sound conduit 15 and leaks to the outside through the air conduit 13*a*. As a result, it is possible to suppress the deterioration of sound quality in a low frequency range in the ear canal 101 compared to the above-mentioned case.

Further, by supporting an intermediate portion of the air conduit 13*a* between the first housing 12 and the second housing 22 by an upper part of a base of an ear, the earbud 10*a* according to this aspect can be used as a so-called ear-hook type earbud equipped with the control circuit and the battery for driving the earbud 10*a*.

Third Embodiment

Figure 4:
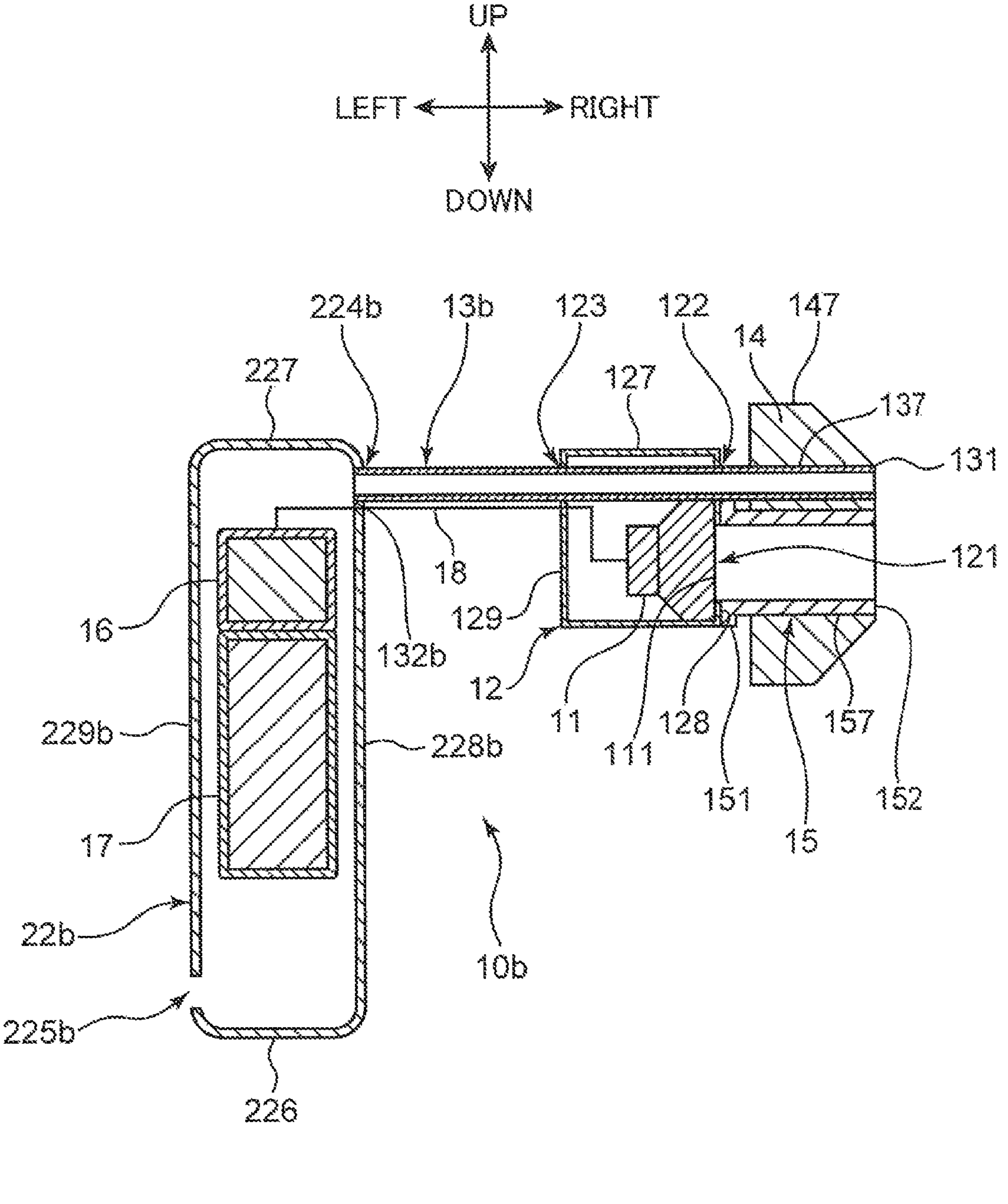
FIG. 4 is a view showing a structure of an earbud according to a third embodiment.

FIG. 4 is a view showing a structure of an earbud 10*h* according to a third embodiment. FIG. 4 is, similar to the left view in FIG. 1, a front sectional view of the earbud 10*h* in a state where the earbud 10*h* is attached to an ear. However, the inside of an ear canal 101 is not illustrated.

As shown in FIG. 4, the earbud 10*b* according to the third embodiment includes a speaker unit 11, a first housing 12, a sound conduit 15, an ear plug 14, an air conduit 13*b*, and a second housing 22*b*.

The second housing 22*b* is a part elongated in a vertical direction and having a box shape. The second housing 22*b* houses a control circuit 16 for controlling driving of the speaker unit 11 and a battery 17 for supplying electric power for driving the speaker unit 11. The second housing 22*b* is disposed such that a right surface 228*b* of the second housing 22*b* faces a left surface 129 of the first housing 12. A fourth opening 224*b* (second opening) is formed in a right surface 228*b* of the second housing 22*b*. A fifth opening 225*b* (third opening) is formed in a left surface 229*b* of the second housing 22*b*.

The fourth opening 224*b* is disposed at the same position (height) as the third opening 123 of the first housing 12 in the vertical direction. With such a configuration, the fourth opening 224*b* is formed such that the fourth opening 224*b* faces the third opening 123. The fourth opening 224*b* has the same shape as the third opening 123.

The fifth opening 225*b* is disposed at a position (height) below the fourth opening 224*b*. The fifth opening 225*b* may have the same shape as the fourth opening 224*b*, or may have the shape different from the shape of the fourth opening 224*b*. As described above, the fifth opening 225*b* is disposed at the position (height) below the fourth opening 224*b*. However, this embodiment is not limited to such a configuration. The fifth opening 225*b* may be formed in the left surface 229*b* of the second housing 22*b* at a position above the fourth opening 224*b*. Alternatively, the fifth opening 225*b* may be formed in an upper surface 227 or a lower surface 226 of the second housing 22*b*. Further, a plurality of openings, which are different from the fourth opening 224*b*, may be formed in any surface of the second housing 22*b*.

A left opening end 132*b* of the air conduit 13*b* (on the first housing 12 side) is connected to the fourth opening 224*b* of the second housing 22*b*. That is, unlike the air conduit 13*a* of the second embodiment shown in FIG. 3, the air conduit 13*b* is configured such that the air conduit 13*b* penetrates the ear plug 14 and the first housing 12, but does not penetrate the second housing 22*b*. As described above, the second opening 122, the third opening 123, and the fourth opening 224*b* are disposed at the same position (height) in the vertical direction. With such a configuration, the air conduit 13*b* can be formed in a simple straight line shape.

As described above, the air conduit 13*b* penetrates the ear plug 14 and the first housing 12. and the opening end 132*b* of the air conduit 13*b* on the first housing 12 side is connected to the fourth opening 224*b* of the second housing 22*b*. Further, the fifth opening 225*b* is formed in the second housing 22*b* at the position below the fourth opening 224*b*. With such a configuration, when the ear plug 14 is inserted into the ear canal 101, air in the ear canal 101 is made to pass through the ear plug 14 and the first housing 12 in the air conduit 13*b* and, then, can be discharged into the second housing 22*b* from the fourth opening 224*b*. Then, the air discharged into the second housing 22*b* is moved from an upper space to a lower space in the second housing 22*b* and, then, can be discharged to the outside through the fifth opening 225*b*.

With such a configuration, a distance along which air in the ear canal 101 is moved can be increased. With such a configuration, it is possible to increase the air resistance which air receives before the air in the ear canal 101 is discharged to the outside. Accordingly, it is possible to reduce an amount of sound waves in a low frequency range which is emitted into the ear canal 101 through the sound conduit 15 and leaks to the outside. As a result, deterioration of sound quality in a low frequency range in the ear canal 101 can be suppressed.

Further, in the case where the earbud 10*b* according to this aspect is used as a so-called ear-hook type earbud equipped with a control circuit and a battery for driving the earbud, an intermediate portion of the air conduit 13*b* between the first housing 12 and the second housing 22*b* is supported by an upper part of a base of an ear. Accordingly, the length of the intermediate portion is limited. However, in this aspect, even if the length of the intermediate portion is limited as described above, by increasing a volume of the second housing 22*b*, the air resistance, which air receives before the sound wave in the ear canal 101 is discharged to the outside, can be increased. As a result, it is possible to suppress the deterioration of sound quality in a low frequency range in the ear canal 101 caused by the leakage of a sound wave in a low frequency range in the ear canal 101 to the outside.

Fourth Embodiment

Figure 5:
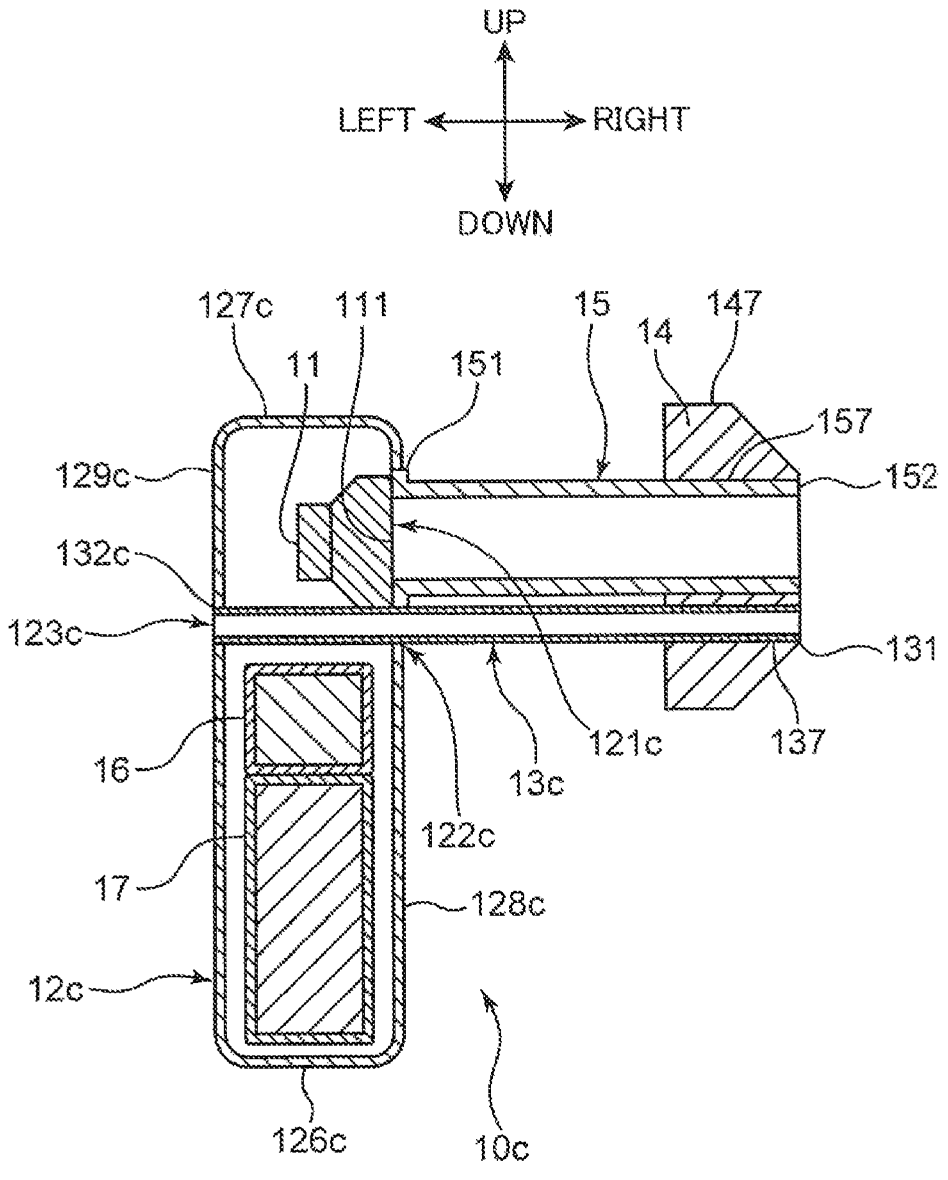
FIG. 5 is a view showing a structure of an earbud according to a fourth embodiment.

FIG. 5 is a view showing a structure of an earbud 10*e* according to a fourth embodiment. FIG. 5 is, similar to the left view in FIG. 1, a front sectional view of the earbud 10*c* in a state where the earbud 10*c* is attached to an ear. However, the inside of an ear canal 101 is not illustrated.

As shown in FIG. 5, the earbud 10*c* according to the fifth embodiment includes a speaker unit 11, a first housing 12*c*, a sound conduit 15, an ear plug 14, and an air conduit 13*c*.

The first housing 12*c* is a part elongated in a vertical direction and having a box shape. The first housing 12*c* houses a speaker unit 11, a control circuit 16 for controlling driving of the speaker unit 11, and a battery 17 for supplying electric power for driving the speaker unit 11. The control circuit 16, the battery 17, and the speaker unit 11 are connected to each other in the first housing 12*c* by a wiring (not shown).

A first opening 121*c* and a second opening 122*c* are formed in a right surface 128*c* of the first housing 12*c*. A third opening 123*c* is formed in a left surface 129*c* of the first housing 12*c*.

The first opening 121*c* has a circular shape and is disposed at a position where the first opening 121*c* faces a sound wave generation surface 111 of the speaker unit 11. The first opening 121*c* is provided for emitting a sound wave generated on the sound wave generation surface 111 of the speaker unit 11 to the outside of the first housing 12*c*.

The second opening 122*c* is disposed below the first opening 121*c*, and has a circular shape and a diameter smaller than a diameter of the first opening 12*k*. The third opening 123*c* has the same shape as the second opening 122*e*, and is disposed at the same position (height) as the second opening 122*c* in the vertical direction. The second opening 122*c* and the third opening 123*e* are formed as through holes through which the air conduit 13*c* having a cylindrical shape passes.

The air conduit 13*c* is disposed so as to penetrate the ear plug 14, and to also pass through the second opening 122*c* formed in the right surface 128*c* of the first housing 12*c* and the third opening 123*c* formed in the left surface 129*c* of the first housing 12*c* below the speaker unit 11 and the sound conduit 15. That is, the air conduit 13*c* is disposed so as to penetrate the ear plug 14 and the first housing 12*e*. A left opening end 132*c* of the air conduit 13*c* is connected to the third opening 123*c*. As described above, the second opening 122*c* and the third opening 123*c* are disposed at the same position (height) as the second opening 122 in the vertical direction. With such a configuration, the air conduit 13*c* can be formed in a simple straight line shape.

The air conduit 13*c* is disposed so as to penetrate the ear plug 14, and on a right surface 128*c* of the first housing 12*c*, to pass through the second opening 122*c* which is different from the first opening 121*c* to which the left opening end 151 of the sound conduit 15 is connected. In this manner, the air conduit 13*c* is disposed independently from the sound conduit 15 so that a space in the air conduit 13*c* and a space in the sound conduit 15 do not directly communicate with each other.

The left opening end 132*c* of the air conduit 13*c* may protrude to the left side with respect to the third opening 123*c*. In the same manner as the second opening 122 and the third opening 123 (FIG. 1) in the first embodiment, the second opening 122*c* and the third opening 123*c* may be disposed above the speaker unit 11 in the first housing 12*c* in the vertical direction, and the second opening 122*c* and the third opening 123*c* may be disposed at the same position (height) in the vertical direction. In conformity with such a configuration, the air conduit 13*c* may be disposed so as to penetrate the first housing 12*c* such that the air conduit 13*c* passes through the second opening 122*c* and the third opening 123*c* above the speaker unit 11 and the sound conduit 15.

In FIG. 5, the second opening 122*c* and the third opening 123*c* are disposed at the same position (height) in the vertical direction. However, the third opening 123*c* may be disposed below the second opening 122*c*. Alternatively, the third opening 123*c* may be disposed on an upper surface 127*c* or a lower surface 126*c* of the first housing 12*c*. In conformity with such a configuration, to prevent the air conduit 13*c* from colliding with the control circuit 16 and the battery 17, the air conduit 13*c* may be formed in a bent shape or in a curved shape in the first housing 12*c* such that the air conduit 13*c* passes through the second opening 122*c* and the third opening 123*c*.

According to this aspect, the control circuit 16 and the battery 17 are housed in the first housing 12*c*. With such a configuration, a space required for using the earbud can be reduced compared to the case where the control circuit for controlling the driving of the speaker unit 11 and the battery for supplying electric power for driving the speaker unit 11 are housed in a housing outside the first housing 12*c*, and the control circuit and the battery are connected with the speaker unit 11 in the first housing 12*c* via a wire.

Fifth Embodiment

Figure 6:
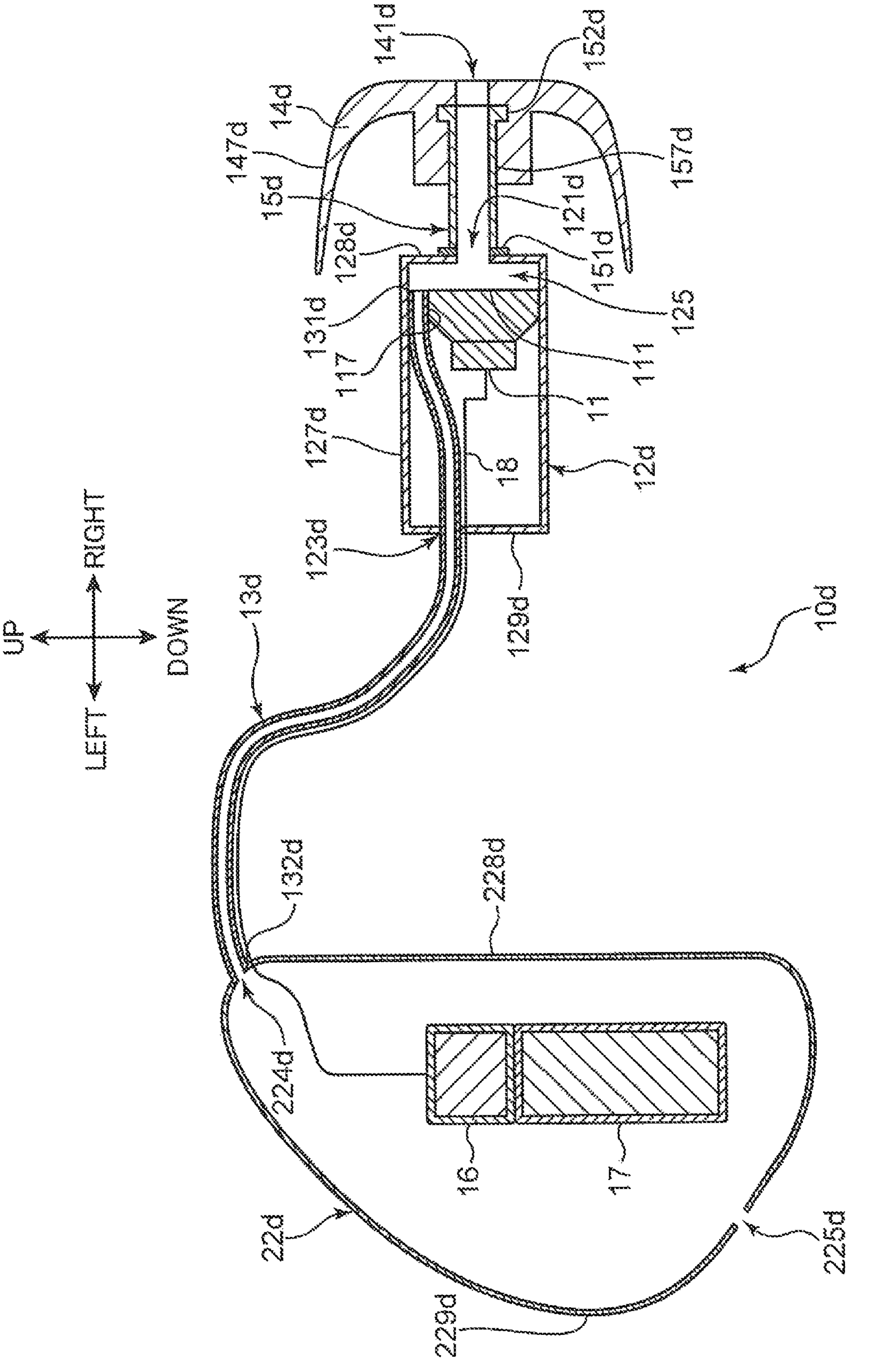
FIG. 6 is a view showing a structure of an earbud according to a fifth embodiment.

FIG. 6 is a view showing a structure of an earbud 10*d* according to a fifth embodiment. FIG. 6 is, similar to the left view in FIG. 1, a front sectional view of the earbud 10*d* in a state where the earbud 10*d* is attached to an ear. However, the inside of an ear canal 101 is not illustrated.

As shown in FIG. 6, the earbud 10*d* according to the fifth embodiment includes a speaker unit 11, a first housing 12*d*, a sound conduit 15*d*, an ear plug 14*d*, a second housing 22*d*, and an air conduit 13*d*.

The first housing 12*d* is a part having substantially a tubular shape elongated in a left-right direction, and houses the speaker unit 11. A first opening 121*d* is formed in a right surface 128*d* of the first housing 12*d*. A third opening 123*d* is formed in a left surface 129*d* of the first housing 12*d*. The first housing 12*d* has a space 125 between a sound wave generation surface 111 of the speaker unit 11 and the first opening 121*d*.

The first opening 121*d* has a circular shape and is disposed at a position where the first opening 121*d* faces the sound wave generation surface 111 of the speaker unit 11. The first opening 121*d* is provided for emitting a sound wave generated on the sound wave generation surface 111 of the speaker unit 11 to the outside of the first housing 12 through the space 125.

The third opening 123*d* is formed in the left surface 129*d* of the first housing 12*d* at an arbitrary position. The third opening 123*d* is formed as a through hole through which the air conduit 13*d* passes.

The sound conduit 15*d* is a part having substantially a tubular shape and has an opening at each of both ends. An inner diameter of the sound conduit 15*d* is substantially the same as a diameter of the first opening 121*d*. A left opening end 151*d* (one end) of the sound conduit 15*d* is connected to the first opening 121*d* formed in the right surface 128*d* of the first housing 12*d*. The ear plug 14*d* is attached to a peripheral surface 157*d* of a right opening end 152*d* (the other end) of the sound conduit 15*d*.

The sound conduit 15*d* allows a sound wave which is generated on the sound wave generation surface 111 of the speaker unit 11 and is emitted from the first opening 121*d* through the space 125 to be inputted into the sound conduit 15*d* from the left opening end 151*d* and to be emitted from the right opening end 152*d*. It is sufficient that the sound conduit 15*d* opens at both ends. A cross-sectional shape of the sound conduit 15*d* may be a shape different from a circular shape.

The ear plug 14*d* is a part which has substantially a tubular shape and has a through hole 141*d*. A dome-shaped umbrella 147*d* is formed at one end of the ear plug 14*d*. The ear plug 14*d* is fixed to the peripheral surface 157*d* of the right opening end 152*d* of the sound conduit 15*d* in a state where the right opening end 152*d* of the sound conduit 15*d* is inserted into the through hole 141*d* to an intermediate portion of the through hole 141*d*. When the ear plug 14*d* is inserted into the ear canal 101 (see FIG. 1), the dome-shaped umbrella 147*d* of the ear plug 14*d* expands in a vertical direction as well as in a front-rear direction, and the dome-shaped umbrella 147*d* is brought into contact with an inner wall of the ear canal 101. As a result, the earbud 10*d* is attached to the ear.

The second housing 22*d* is a part having a bag shape. A right side of the second housing 22*d* is formed in a flat shape. The second housing 22*d* houses a control circuit 16 and a battery 17. The second housing 22*d* is disposed such that a right flat surface 228*d* of the second housing 22*d* faces the left surface 129*d* of the first housing 12*d*. A fourth opening 224*d* (second opening) is formed in the right flat surface 228*d* of the second housing 22*d*. A fifth opening 225*d* (third opening) is formed in a curved surface 229*d* of the second housing 22*d*.

The fourth opening 224*d* has the same shape as the third opening 123*d*. The fifth opening 225*d* is disposed at a position (height) below the fourth opening 224*d*. The fifth opening 225*d* may have the same shape as the fourth opening 224*d*, or may have the shape different from the shape of the fourth opening 224*d*. Further, a plurality of openings which are different from the fourth opening 224*b* may be formed in the right flat surface 228*d* of the second housing 22*d* or in the curved surface 229*d* of the second housing 22*d*.

The control circuit 16, the battery 17 and the speaker unit 11 are connected with each other by a wiring 18 attached to an outer peripheral portion of the air conduit 13*d* which passes through the fourth opening 224*d* and the third opening 123*d*. In FIG. 6, for the sake of clarity, the wiring 18 is shown at a position away from an outer peripheral portion of the air conduit 13*d*.

The air conduit 13*d* is formed of, for example, a rubber tube or a silicon tube. The air conduit 13*d* is formed of a tube which has an opening on both ends. The shape of the air conduit 13*d* can be flexibly changed. A right opening end 131*d* (one end) of the air conduit 13*d* is disposed in the space 125. A left opening end 132*d* (the other end) of the air conduit 13*d* is connected to the fourth opening 224*d*. The shape of the air conduit 13*d* can be changed flexibly. Accordingly, the air conduit 13*d* is disposed so as to penetrate the first housing 12*d* such that the air conduit 13*d* passes through the third opening 123*d* formed in the left surface 129*d* of the first housing 12*d* at an arbitrary position.

A peripheral surface of the right opening end 131*d* of the air conduit 13*d* is brought into contact with an upper surface 117 of the speaker unit 11 and a peripheral surface 127*d* of the first housing 12*d*. An inner diameter of the air conduit 13*d* is set smaller than the inner diameter of the sound conduit 15*d*, that is, the diameter of the first opening 121*d*. With such a configuration, a sound wave which is emitted from the generation surface 111 of the speaker unit 11 into the space 125 easily passes through the sound conduit 15 through the first opening 121*d*. The right opening end 131*d* of the air conduit 13*d* may protrude to the right side with respect to the generation surface 111 of the speaker unit 11 in the space 125.

According to this aspect, the air conduit 13*d* is disposed so as to penetrate the first housing 12*d*, the right opening end 131*d* of the air conduit 13*d* is disposed in the space 125 between the sound wave generation surface of the speaker unit 11 in the first housing 12*d* and the first opening 121, and the left opening end 132*d* of the air conduit 13*d* is connected to the fourth opening 224*d*. The fifth opening 225*d* is formed in the second housing 22*d* at a position below the fourth opening 224*d*. With such a configuration, when the ear plug 14*d* is inserted into the ear canal 101, air in the ear canal 101 can be made to pass through the sound conduit 15*d*, and to be discharged into the space 125 between the sound wave generation surface 111 of the speaker unit 11 and the first opening 121 in the first housing 12*d*. Then, air discharged into the space 125 can be made to pass through the first housing 12*d* in the air conduit 13*d*, and can be discharged into the second housing 22*d*. Then, the air discharged into the second housing 22*d* is moved from an upper space to a lower space in the second housing 22*d* and, then, can be discharged to the outside through the fifth opening 225*b*.

With such a configuration, air resistance, which air in the ear canal 101 receives before air is discharged to the outside, can be increased compared to the conventional case where air in the ear canal 101 is discharged to the outside through the air conduit disposed in the sound conduit. Accordingly, compared to the conventional case, it is possible to reduce an amount of sound waves in a low frequency range which is emitted into the ear canal 101 through the sound conduit 15*d* and leaks to the outside. As a result, compared to the conventional case, it is possible to suppress deterioration of sound quality in a low frequency range in the ear canal 101.

The above embodiments merely exemplify the embodiments according to the present disclosure, and the present disclosure has no intention of limiting the present disclosure to the above embodiments. For example, the following modified embodiments may be adopted. In the description made hereinafter, constituent elements which are identical with the constituent elements described above are given the same reference numerals, and the description of the constituent elements is omitted.

Modified Embodiment

As portions indicated by a dotted line in FIG. 3, in the earbud 10*a* according to the second embodiment, the first housing 12 or the second housing 22 may be further provided with an adjustment mechanism 30 which changes an inner diameter of the air conduit 13*a*. In conformity with such a configuration, the control circuit 16 (control unit) may further control the adjustment mechanism 30 so as to switch the air conduit 13*a* to a closed state where air is not discharged to the outside or an open state where air is discharged to the outside at maximum.

Figure 8:
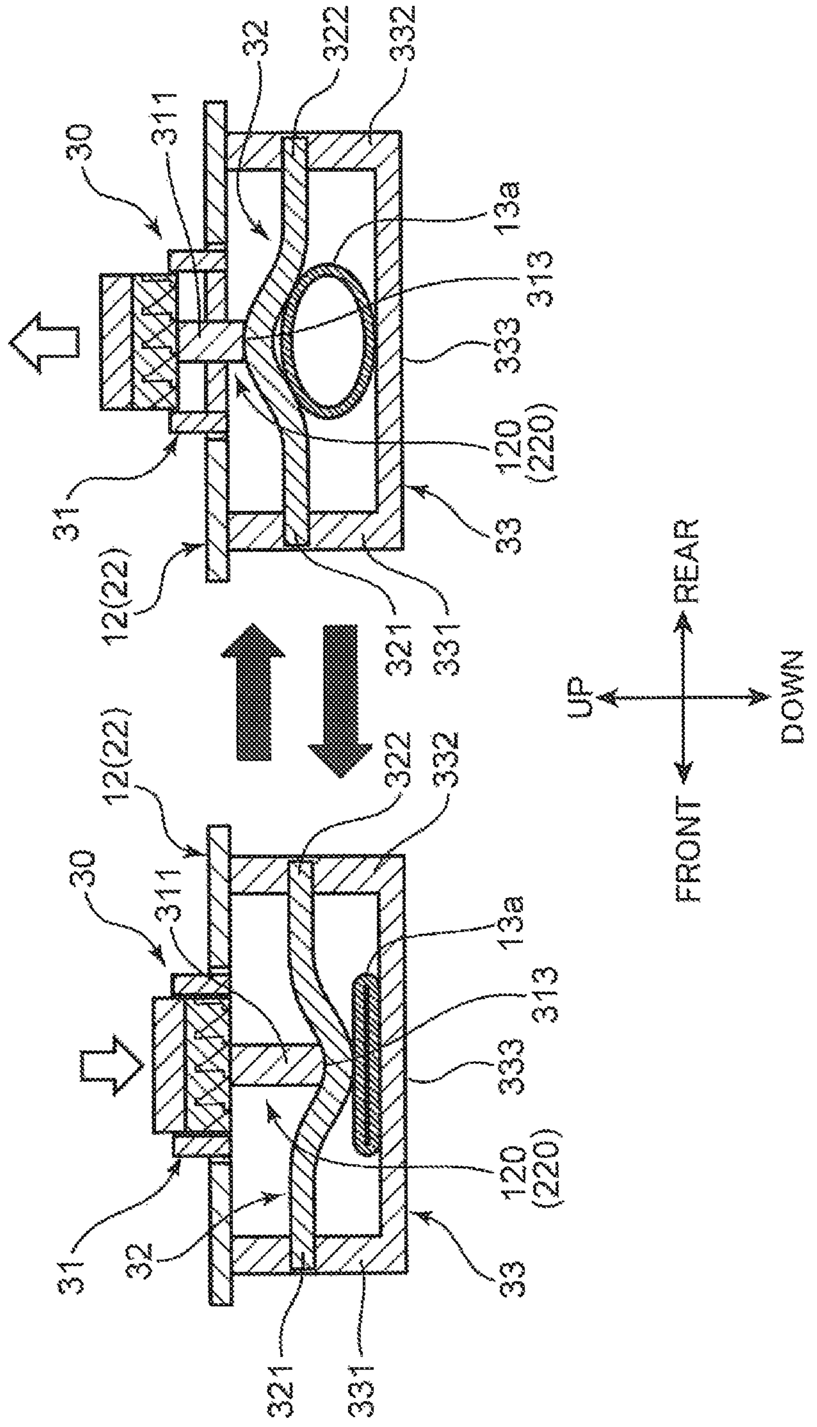
FIG. 8 is a view showing a first example of a structure of an adjustment mechanism.
Figure 9:
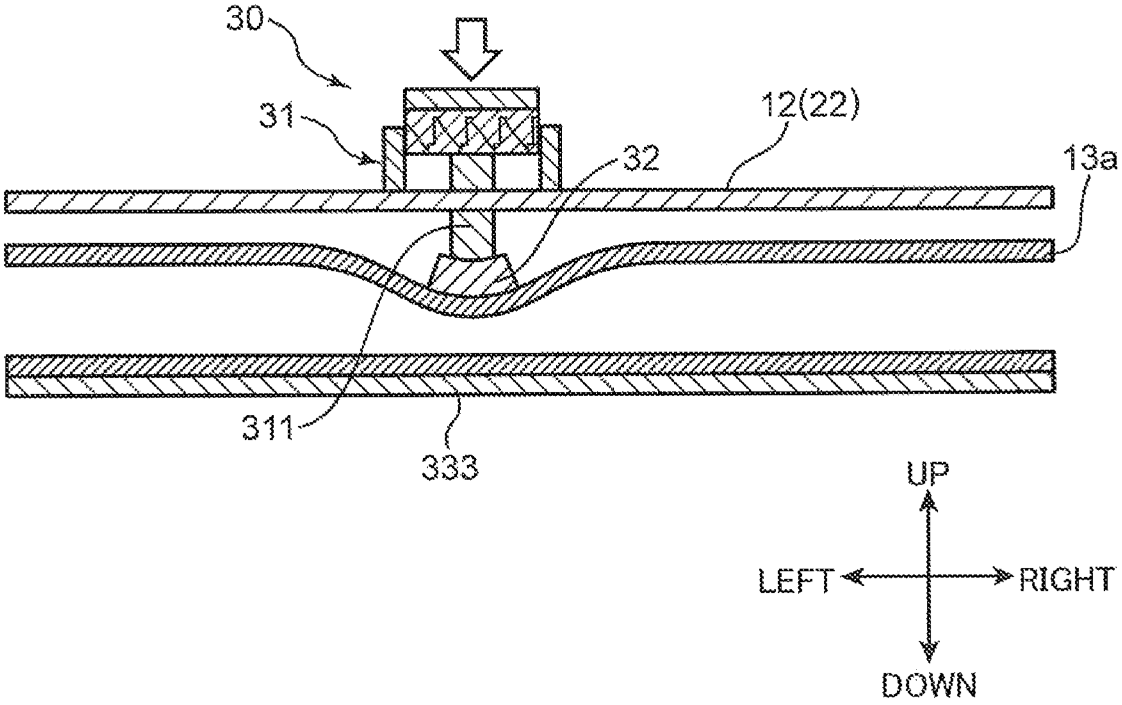
FIG. 9 is a front sectional view which shows the first example of the structure of the adjustment mechanism.

Specifically, the adjustment mechanism 30 is configured as shown in FIGS. 8 and 9, for example. FIG. 8 is a view showing a first example of the structure of the adjustment mechanism 30. FIG. 8 is a cross-sectional view taken along line VIII-VIII in FIG. 3. FIG. 9 is a front sectional view showing the first example of the structure of the adjustment mechanism 30. As shown in FIG. 8, the adjustment mechanism 30 includes a housing 33, a pressing member 32, and a momentary switch 31.

The housing 33 includes: a pair of side walls 331 and 332 in a front-rear direction; and a bottom surface 333 disposed on lower portions of the pair of side walls 331 and 332. The first housing 12 or the second housing 22 is disposed on upper portions of the pair of side walls 331, 332. The air conduit 13*a* is disposed on the bottom surface 333 of the housing 33. The air conduit 13*a* is formed of an elastic member made of silicon rubber or the like. As a result, the air conduit 13*a* can be deformed when pressed from the outside so that an inner diameter of the air conduit 13*a* can be changed.

The pressing member 32 is formed of a rubber member made of silicon rubber or the like. The pressing member 32 is disposed above the air conduit 13*a*. An end 321 of the pressing member 32 on a front side is supported by the side wall 331 of the housing 33 on the front side. An end 322 of the pressing member 32 on a rear side is supported by a side wall 332 of the housing 33 on the rear side.

The momentary switch 31 has a T-shape when viewed from a left-and right direction. The momentary switch 31 is mounted such that a shaft portion 311 which extends in a vertical direction passes through a through hole 120 formed in the first housing 12 or a through hole 220 formed in the second housing 22. A lower end 313 of the momentary switch 31 is attached to the pressing member 32.

The momentary switch 31 moves downward during a period where a drive signal indicating downward movement is inputted to the momentary switch 31 from the control circuit 16. The momentary switch 31 moves upward during a period where a drive signal indicating upward movement is inputted to the momentary switch 31 from the control circuit 16. In this manner, when the momentary switch 31 moves in the vertical direction, the pressing member 32 attached to the lower end 313 of the momentary switch 31 also moves in the vertical direction.

When the pressing member 32 moves downward, the air conduit 13*a* is pressed by the pressing member 32 so that the inner diameter of the air conduit 13*a* is decreased. A left view in FIG. 8 shows an example where the control circuit 16 outputs a drive signal indicating downward movement to the adjustment mechanism 30 for a predetermined maximum time, so that the momentary switch 31 moves downward to a maximum lower limit and the air conduit 13*a* is switched to a closed state.

On the other hand, when the pressing member 32 moves upward, a force with which the pressing member 32 presses the air conduit 13*a* is decreased and hence, the inner diameter of the air conduit 13*a* is increased. A right view in FIG. 8 shows an example where the control circuit 16 outputs a drive signal indicating the upward movement to the adjustment mechanism 30 for a predetermined maximum time, so that the momentary switch 31 moves to a maximum upper limit and the air conduit 13*a* is switched to an open state.

FIG. 9 shows a state of the air conduit 13*a* in the process of switching the air conduit 13*a* from the open state shown in the right view in FIG. 8 to the closed state shown in the left view in FIG. 8.

The control circuit 16 includes a wireless communication circuit (not shown) which performs wireless communication with a mobile terminal such as a smartphone. When the control circuit 16 receives an instruction from the mobile terminal to switch the air conduit 13*a* to the closed state via the wireless communication circuit, the control circuit 16 outputs a drive signal indicating downward movement to the adjustment mechanism 30 for a predetermined maximum time. As a result, the adjustment mechanism 30 switches the air conduit 13*a* to the closed state by moving the momentary switch 31 downward to the maximum lower limit.

On the other hand, when the control circuit 16 receives an instruction from the mobile terminal to switch the air conduit 13*a* to the open state via the wireless communication circuit, the control circuit 16 outputs a drive signal indicating upward movement to the adjustment mechanism 30 for the predetermined maximum time. As a result, the adjustment mechanism 30 switches the air conduit 13*a* to the open state by moving the momentary switch 31 upward to the maximum upper limit.

Figure 10:
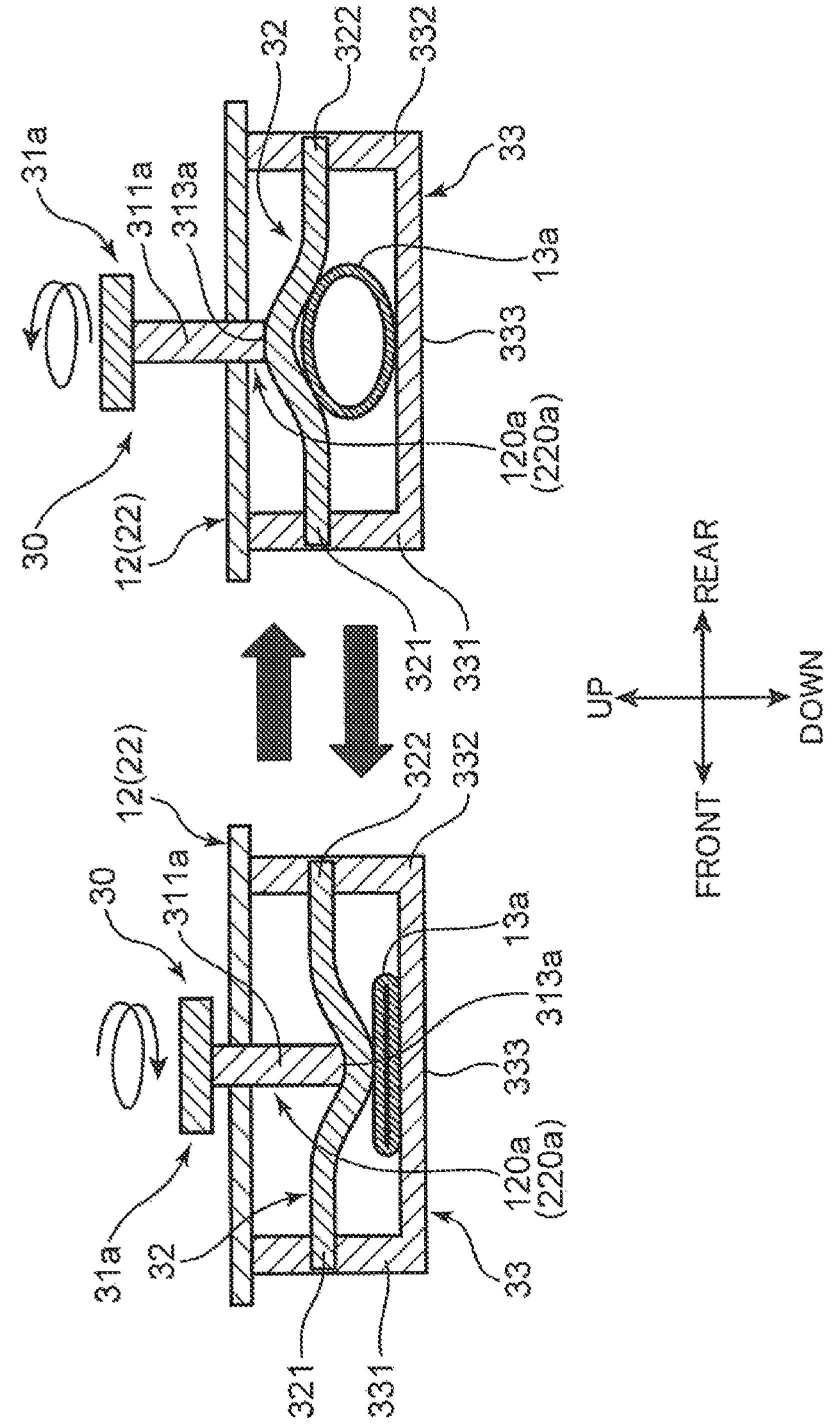
FIG. 10 is a view showing a second example of the structure of the adjustment mechanism.
Figure 11:
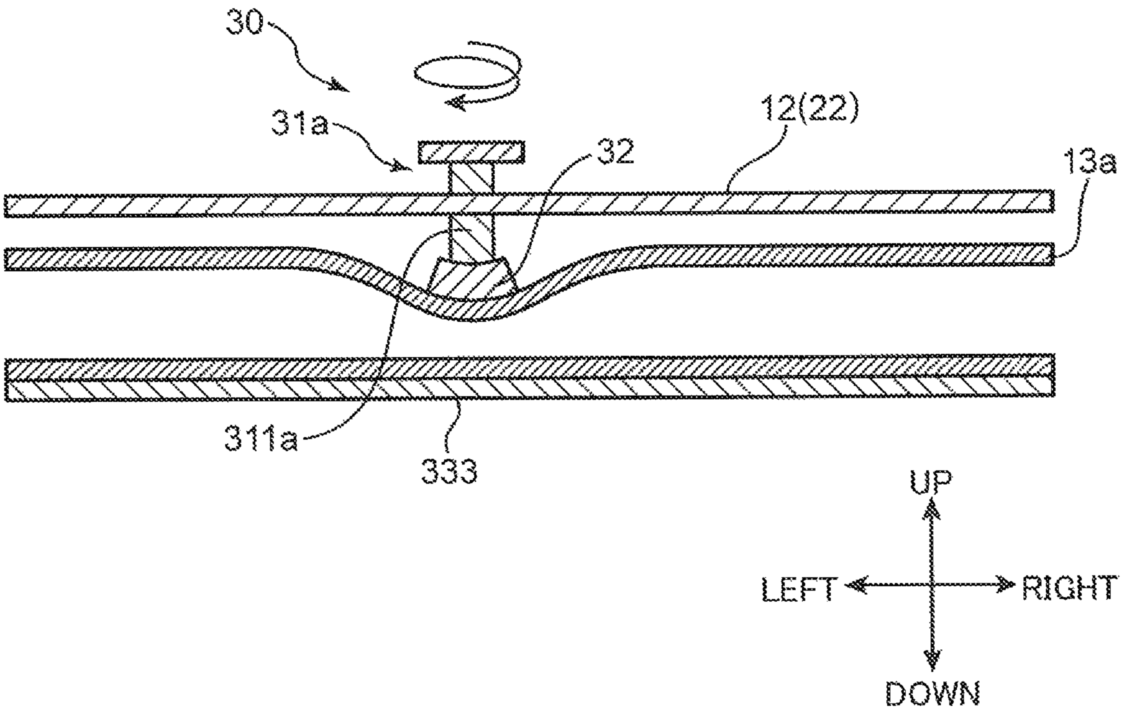
FIG. 11 is a front sectional view which shows the second example of the structure of the adjustment mechanism.

The adjustment mechanism 30 is not limited to the example shown in FIGS. 8 and 9, and may be configured as shown in FIGS. 10 and 11, for example. FIG. 10 is a view showing a second example of a structure of an adjustment mechanism 30. FIG. 10 is a cross-sectional view taken along line VIII-VIII in FIG. 3. FIG. 11 is a front sectional view showing the second example of the structure of the adjustment mechanism 30.

As shown in FIG. 10, in this specific example, the adjustment mechanism 30 includes a valve type open-close valve 31*a* in place of the momentary switch 31 (FIGS. 8 and 9). The valve type open-close valve 31*a* has a T-shape when viewed from a left-right direction. The valve type open-close valve 31*a* includes a shaft portion 311*a* extending in a vertical direction. A spiral threaded groove is formed on a peripheral surface of the shaft portion 311*a*. The valve type open-close valve 31*a* is mounted such that the threaded groove of the shaft portion 311*a* engages with a threaded hole 120*a* formed in the first housing 12 or a threaded hole 220*a* formed in the second housing 22. A lower end 313*a* of the valve type open-close valve 31*a* is attached to a pressing member 32 in a state where the shaft portion 311*a* forms a rotary shaft and is rotatable about an axis.

During a period where a rotation drive signal indicating a clockwise rotation is inputted from the control circuit 16 to the valve type open-close valve 31*a*, the shaft portion 311*a* rotates in a clockwise direction. As a result, the shaft portion 311*a* which engages with the threaded hole 120*a* formed in the first housing 12 or the threaded hole 220*a* formed in the second housing 22 moves downward. On the other hand, during a period where a rotation drive signal indicating a counterclockwise rotation is inputted from the control circuit 16 to the valve type open-close valve 31*a*, the shaft portion 311*a* rotates in a counterclockwise direction. As a result, the shaft portion 311*a* which engages with the threaded hole 120*a* or the threaded hole 220*a* moves upward. In this manner, when the shaft portion 311*a* of the valve type open-close valve 31*a* moves in the vertical direction, the pressing member 32 attached to the lower end 313 of the valve type open-close valve 31*a* also moves in the vertical direction.

When the pressing member 32 moves downward, the air conduit 13*a* is pressed by the pressing member 32 so that the inner diameter of the air conduit 13*a* is decreased. A left view in FIG. 10 shows a state where the control circuit 16 outputs a rotation drive signal indicating a clockwise rotation to the adjustment mechanism 30 for a predetermined maximum time, so that the shaft portion 311*a* of the valve type open-close valve 31*a* moves downward to a maximum lower limit and the air conduit 13*a* is switched to a closed state.

On the other hand, when the pressing member 32 moves upward, a force with which the pressing member 32 presses the air conduit 13*a* is decreased and hence, the inner diameter of the air conduit 13*a* is increased. A right view in FIG. 10 shows a state where the control circuit 16 outputs a rotation drive signal indicating a counterclockwise rotation to the adjustment mechanism 30 for a predetermined maximum time, so that the shaft portion 311*a* of the valve type open-close valve 31*a* moves upward to a maximum upper limit and the air conduit 13*a* is switched to an open state.

FIG. 11 shows a state of the air conduit 13*a* in the process of switching the air conduit 13*a* from the open state shown in the right view in FIG. 10 to the closed state shown in the left view in FIG. 10.

In this configuration, when the control circuit 16 receives an instruction from the mobile terminal to switch the air conduit 13*a* to the closed state via the wireless communication circuit, the control circuit 16 outputs a rotation drive signal indicating a clockwise rotation to the adjustment mechanism 30 for a predetermined maximum time. As a result, the adjustment mechanism 30 switches the air conduit 13*a* to the closed state by moving the shaft portion 311*a* of the valve type open-close valve 31*a* downward to the maximum lower limit.

On the other hand, when the control circuit 16 receives an instruction from the mobile terminal to switch the air conduit 13*a* to the open state via the wireless communication circuit, the control circuit 16 outputs a rotation drive signal indicating a counterclockwise rotation to the adjustment mechanism 30 for a predetermined maximum time. As a result, the adjustment mechanism 30 switches the air conduit 13*a* to the open state by moving the shaft portion 311*a* of the valve type open-close valve 31*a* upward to the maximum upper limit.

Contrary to the above example, a thread groove may be formed on the peripheral surface of the shaft portion 311*a* so that the shaft portion 311*a* moves upward by rotating in a clockwise direction and moves downward by rotating in a counterclockwise direction.

According to the configuration of the present modified embodiment, the control circuit 16 can, by controlling the adjustment mechanism 30, perform switching whether air in the ear canal should be discharged to the outside through the air conduit 13*a* or not by switching the air conduit 13*a* between an open state and a closed state. As a result, it is possible to perform switching whether priority should be assigned to elimination of discomfort caused by a moistened state in the ear canal or suppression of deterioration of sound quality of a reproduced sound in a low frequency range.

Further, by arranging the adjustment mechanism 30 in the first housing 12, the second housing 22 can be made smaller compared to the case where the adjustment mechanism 30 is arranged in the second housing 22. In the case where a hollow portion formed in the second housing 22 is larger than a hollow portion formed in the first housing 12, it is easier to arrange the adjustment mechanism 30 in the second housing 22 than in the first housing 12.

In the same manner as described above, the adjustment mechanism 30 may be disposed in the first housing 12 shown in FIG. 1. In this case, a control circuit similar to the control circuit 16 (FIG. 3) may be disposed in the first housing 12, and a change in the inner diameter of the air conduit 13*a* by the adjustment mechanism 30 may be controlled by such a control circuit. The adjustment mechanism 30 may be disposed in each of the first housings 12, 12*c*, and 12*d* shown in FIGS. 4 to 6. In this case, the control circuit 16 shown in each of FIGS. 4 to 6 may control a change in the inner diameters of the air conduits 13*b*, 13*c*, and 13*d* shown in each of FIGS. 4 to 6 by the adjustment mechanism 30.

INDUSTRIAL APPLICABILITY

The earbud of the present disclosure can be used as an earbud for a TV, a portable music player, a mobile phone and the like. In particular, the earbud of the present disclosure is useful in the case where a change in sound pressure frequency characteristic of an earbud is avoided while eliminating discomfort caused by a moistened state in the ear canal.

The invention claimed is:

1. An earbud comprising:

a speaker unit which generates a sound wave;

an outermost, first housing which houses the speaker unit, and has a first opening which faces a sound wave generation surface of the speaker unit;

a sound conduit having one end connected to the first opening;

an ear plug which is attached to the other end of the sound conduit, the ear plug being inserted into an ear canal; and an air conduit which is disposed so as to penetrate the ear plug and the first housing, wherein opposite ends of the air conduit extend beyond the first housing.

2. The earbud according to claim 1, further comprising:

a second housing which houses a control circuit for controlling driving of the speaker unit; and a battery which supplies electric power for driving the speaker unit, wherein the air conduit is disposed so as to penetrate the second housing.

3. The earbud according to claim 1, further comprising second housing which has a second opening and a third opening, and houses a control circuit for controlling driving of the speaker unit and a battery for supplying electric power for driving the speaker unit, wherein one end of the air conduit on a first housing side is connected to the second opening.

4. The earbud according to claim 1, wherein the first housing further houses a control circuit for controlling driving of the speaker unit and a battery for supplying electric power for driving the speaker unit.

5. An earbud comprising:

a speaker unit which generates a sound wave;

a first housing which houses the speaker unit, and has a first opening which faces a sound wave generation surface of the speaker unit;

a second housing which has a second opening and a third opening and houses a control circuit for controlling driving of the speaker unit and a battery for supplying electric power for driving the speaker unit;

a sound conduit having one end connected to the first opening;

an ear plug which is attached to the other end of the sound conduit, the ear plug being inserted into the ear canal; and an air conduit having one end disposed in a space between the sound wave generation surface and the first opening in the first housing and the other end connected to the second opening, the air conduit being configured to penetrate the first housing.

6. The earbud according to any one of claim 1, further comprising:

an adjustment mechanism which is configured to change an inner diameter of the air conduit; and a control unit which is configured to switch the air conduit between a closed state where the air conduit is closed and an open state where the air conduit is opened by controlling the adjustment mechanism.

7. An earbud comprising:

a speaker which generates a sound wave;

a first housing which houses the speaker, and has a first opening which faces a sound wave generation surface of the speaker;

a sound conduit having one end connected to the first opening;

an ear plug which is attached to the other end of the sound conduit, the ear plug being insertable into an ear canal; and an air conduit which is disposed so as to penetrate the ear plug and the first housing, wherein an entirety of the air conduit extends in a straight line.

* * * * *